US008915446B1

(12) United States Patent
Hammon

(10) Patent No.: US 8,915,446 B1
(45) Date of Patent: Dec. 23, 2014

(54) APPARATUS HAVING REMOVABLE MEMBER AND CARRIER FOR SAME

(76) Inventor: Robert E. Hammon, Wellsville, KS (US)

(*) Notice: Subject to any disclaimer, the term of this patent is extended or adjusted under 35 U.S.C. 154(b) by 0 days.

(21) Appl. No.: 13/433,005

(22) Filed: Mar. 28, 2012

Related U.S. Application Data

(60) Provisional application No. 61/468,933, filed on Mar. 29, 2011.

(51) Int. Cl.
*G06K 19/00* (2006.01)

(52) U.S. Cl.
USPC .......... 235/487; 235/493

(58) Field of Classification Search
USPC .......... 235/487, 493
See application file for complete search history.

(56) References Cited

U.S. PATENT DOCUMENTS 2,135,865 A * 11/1938 Winokar .......... 229/71
2,285,906 A * 6/1942 Davio .......... 150/142
2,982,322 A 5/1961 Seitz
3,655,119 A * 4/1972 Thompson .......... 229/72
3,734,396 A * 5/1973 Cowan .......... 229/68.1
3,788,540 A * 1/1974 Sammons .......... 229/72
3,838,808 A * 10/1974 Schroeder .......... 229/72
3,903,945 A * 9/1975 Skeba .......... 150/133
4,488,737 A 12/1984 Jacobs et al.
4,534,581 A 8/1985 Engh
4,621,729 A 11/1986 Jackson
4,647,714 A * 3/1987 Goto .......... 174/36
4,774,148 A * 9/1988 Goto .......... 428/607
4,850,611 A 7/1989 Skelton
4,905,831 A * 3/1990 Bagdis et al. .......... 206/308.3
5,029,902 A 7/1991 Komori
5,131,686 A * 7/1992 Carlson .......... 283/75
5,141,485 A 8/1992 Welt
5,303,956 A 4/1994 Zoland
5,487,566 A * 1/1996 Hedge, Jr. .......... 283/56
5,529,172 A 6/1996 Laughlin
5,579,908 A * 12/1996 Johnson .......... 206/308.3
5,921,584 A * 7/1999 Goade, Sr. .......... 283/107
6,000,724 A * 12/1999 Holway .......... 283/66.1
6,016,908 A * 1/2000 Gaetano .......... 206/308.1
6,103,332 A 8/2000 McDonald
6,299,530 B1 * 10/2001 Hansted et al. .......... 462/64
6,382,412 B1 5/2002 Wood
6,539,653 B1 * 4/2003 Finke .......... 40/124.06
6,572,149 B2 6/2003 Long
6,715,795 B2 * 4/2004 Klure .......... 283/62
6,732,459 B1 * 5/2004 Clark .......... 40/124.06
6,811,025 B1 * 11/2004 Kaplan .......... 206/37
6,974,157 B1 12/2005 Hammon
7,219,829 B2 * 5/2007 Treat .......... 229/92.8
8,256,682 B2 * 9/2012 Chakiris et al. .......... 235/486
2003/0028439 A1 * 2/2003 Cox et al. .......... 705/26
2003/0218329 A1 * 11/2003 Buck .......... 283/56
2004/0069661 A1 * 4/2004 Telleen .......... 206/232
2004/0146688 A1 * 7/2004 Treat .......... 428/78
2005/0017502 A1 * 1/2005 Chariker .......... 283/106
2005/0116462 A1 * 6/2005 Telleen .......... 283/56
2009/0091123 A1 * 4/2009 Conley et al. .......... 283/106

* cited by examiner

*Primary Examiner* — Paultep Savusdiphol
(74) *Attorney, Agent, or Firm* — Lathrop & Gage LLP

(57) ABSTRACT

Various apparatus having removable member and carrier for same are disclosed. In one embodiment, a card with carrier includes a sheet of material having a central area, a bottom area, and another area. The bottom area is lowerly adjacent and foldable relative to the central area, and the another area is adjacent and foldable relative to the central area. The central area, the another area, and the bottom area are initially of a unitary construction. A card is coupled to or formed by the another area and is separable from the central area. Folding the bottom area inwards towards the central area forms a pocket configured to retain the card.

18 Claims, 10 Drawing Sheets

APPARATUS HAVING REMOVABLE MEMBER AND CARRIER FOR SAME

CROSS-REFERENCE TO RELATED APPLICATIONS

The present application claims priority to U.S. Provisional Patent Application No. 61/468,933, filed Mar. 29, 2011, and titled "Apparatus Having Removable Member and Carrier for Same", the disclosure of which is incorporated herein in its entirety by reference.

FIELD OF THE INVENTION

The invention relates generally to the field of cards and card carriers.

BACKGROUND

Businesses today may utilize a variety of cards. For example, a hotel may provide to each guest a magnetic key card to allow the guest to access a particular room. Or, a restaurant may provide to its customer a customer loyalty card, to track the number of times the customer has eaten at the restaurant. And for another example, business cards are often used to provide contact information and memorialize interactions.

Often, it is desirable for the business to provide to each customer more than one card. For example, a hotel may wish to provide each guest with two magnetic key cards, so that the guest may share access to his room or obtain entry even if one of his key cards stops functioning.

It is not uncommon for customers to temporarily misplace or lose a card provided to them by a business. For example, a hotel guest may leave one of his key cards inside his room, and then, when attempting to open his room, realize that his second key card is no longer functioning properly. To access his room, thus, the guest may be forced to obtain a replacement card from the hotel's reception desk, which may cause the guest unnecessary distress.

Businesses (e.g., hotels), to help ensure that their customers are able to securely retain their cards, may provide their customers with card carriers. Businesses may procure these card carriers and cards from separate sources, and may store these cards and card carriers separately. This may unnecessarily increase the storage space occupied by these card carriers and cards, which, ultimately, may be provided to the customer together.

SUMMARY

Systems and methods for carrying and transporting cards are disclosed. According to one embodiment, a carrier for transporting cards includes a central area, a top area above the central area, and a bottom area below the central area. The top area is separated from the central area by an upper horizontal border and the bottom area is separated from the central area by a lower horizontal border. A first side area is laterally adjacent the central area and is separated from the central area by a first vertical border. The central area, the top area, the bottom area, and the first side area are initially of a unitary construction. A first card is coupled to or formed by the first side area and is configured to be detached from the central area. The top area is configured to be folded inward towards the central area along the upper horizontal border and the bottom area is configured to be folded inward toward the central area along the second horizontal border to form a pocket. The pocket is configured to retain the first card.

According to another embodiment, a card with carrier includes a sheet of material having a central area, a bottom area lowerly adjacent and foldable relative to the central area, and another area adjacent and foldable relative to the central area. The central area, the bottom area, and the another area are initially of a unitary construction. The card is coupled to or formed by the another area and is separable from the central area. Folding the bottom area inward towards the central area forms a pocket configured to retain the card.

According to yet another embodiment, a carrier for transporting cards includes a central area, a top area atop the central area, and a bottom area below the central area. The top area is separated from the central area by an upper horizontal border, and the bottom area is separated from the central area by a lower horizontal border. A first side area is laterally adjacent the central area and is separated from the central area by a first vertical border. The first vertical border comprises perforations. A second side area is laterally adjacent the central area and is separated from the central area by a second vertical border. The second vertical border, like the first vertical border, also comprises perforations. The central area, the top area, the bottom area, the first side area, and the second side area are initially of a unitary construction. Adhesive is used to couple a first card to the first side area and a second card to the second side area. The first card is configured to be detached from the central area along the first vertical border and the second card is configured to be detached from the central area along the second vertical border. The top area is configured to be folded inward towards the central area along the upper horizontal border and the bottom area is configured to be folded inward towards the central area along the lower horizontal border to form a pocket. The pocket is configured to retain the first card and the second card.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

Embodiments of the present invention provide an all-in-one card carrier and methods of making same. In this document, references are made to directions such as front, back, left, right, and the like. These references are exemplary only and are used to describe the disclosed invention in a typical orientation or operation, but are not independently limiting.

Figure 1:
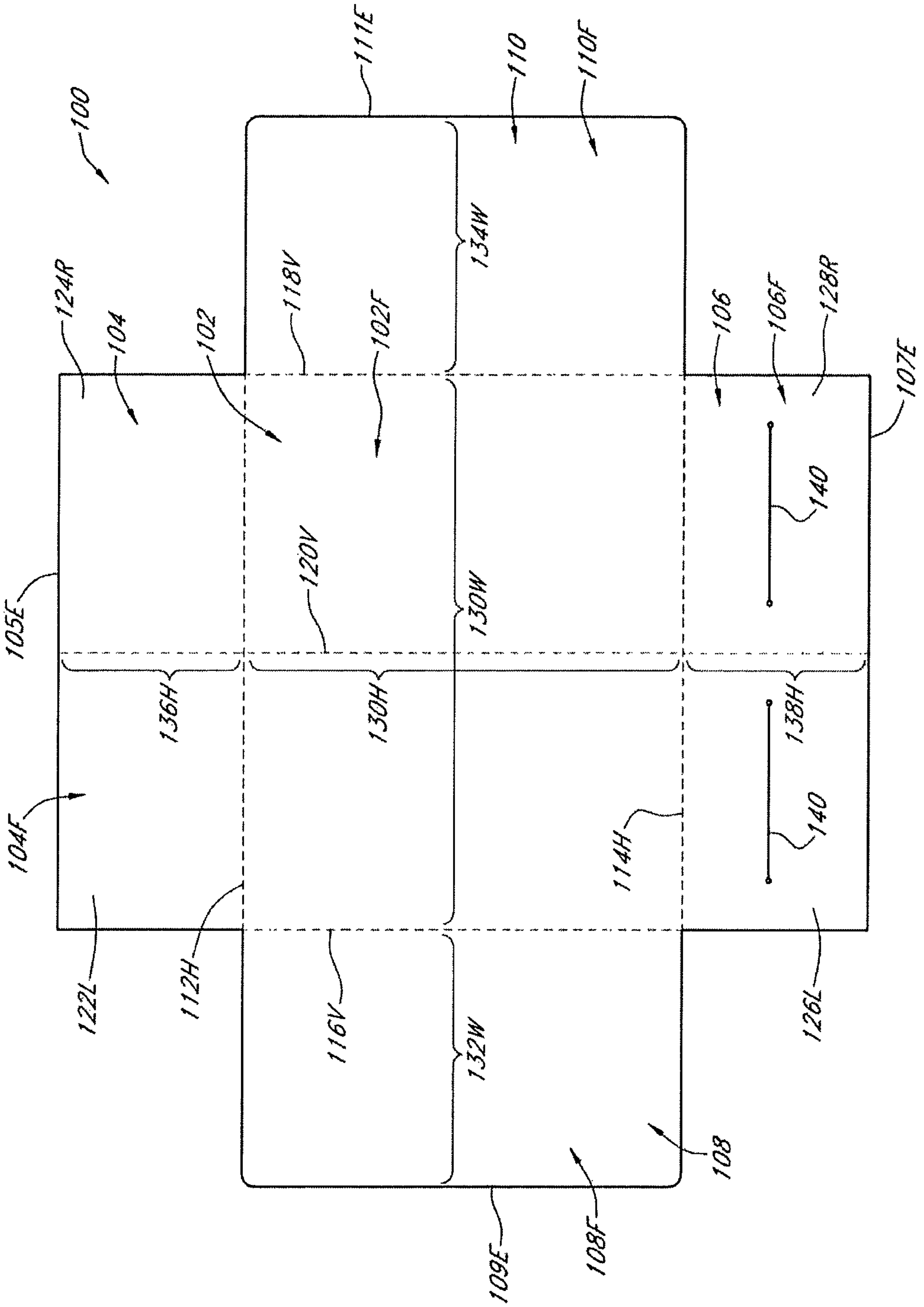
FIG. 1 is a top view of a card carrier in an initial unfolded position according to one embodiment of the current invention.

FIG. 1 shows a top view of one embodiment 100 of an all-in-one card carrier in accordance with the teachings of the current invention. The card carrier 100, which is shown in an unfolded position in FIG. 1, may be of a unitary construction. The carrier 100 may be made of paper, cardboard, or other desirable materials.

The carrier 100 may have a central area 102, a foldable top area 104 atop the central area 102, and a foldable bottom area 106 beneath the central area 102. The carrier may also have a removable left side area 108 to the left of the central area 102, and a removable right side area 110 to the right of the central area 102. Each of the central area 102, the foldable top area 104, the foldable bottom area 106, the removable left side area 108, and the removable right side area 110, may have a front face 102F, 104F, 106F, 108F, and 110F (as shown in FIG. 1), and a back face 102B, 104B, 106B, 108B, 110B respectively. The foldable top area 104 may have an outer (i.e. top most) edge 105E, the foldable bottom area 106 may have an outer (i.e., bottom most) edge 107E, the removable left side area 108 may have an outer (i.e., left most) edge 109E, and the removable right side 110 area may have an outer (i.e., right most) edge 111E.

The foldable top area 104 and the central area 102 may be separated by an upper horizontal border 112H that extends below and generally parallel to the outer edge 105E of the foldable top area 104. The upper horizontal border 11211 may be perforated or creased, or a dotted line (or other indicia or physical property) may delineate the upper horizontal border 112H. The foldable bottom area 106 may similarly be separated from the central area 102 by a lower horizontal border 114H, which may be perforated, creased, or otherwise delineated, and which may extend above and generally parallel to the outer edge 107E of the foldable bottom area 106.

A left vertical border 116V may extend to the right of and generally parallel to the outer edge 109E of the removable left side area 108. The left vertical border 116V may be perforated, and may separate the removable left side area 108 from the central area 102. Similarly, a right vertical border 118V, which may be perforated, may separate the removable right side area 110 from the central area 102. The right vertical border 118V may extend to the left of and generally parallel to the outer edge 111E of the removable right side area 110.

The central area 102C may also include a central vertical border 120V. The central vertical border 120V may be creased or otherwise marked. As can be seen from FIG. 1, the central vertical border 120V may extend above the central area 102 to the outer edge 105E of the foldable top area 104, and may separate the top area 104 into a left portion 122L and a right portion 124R. The central vertical border 120V may also extend beneath the central area 102 to the outer edge 107E of the foldable bottom area 106, and may separate the bottom area 106 into a left portion 126L and a right portion 128R.

The central area 102 may have a height 130H and a width 130W. The top side area 104 may have a height 13611 and the bottom side area 106 may have a height 138H. The height 136H of the top side area 104 may or may not be equal to the height 138H of the bottom side area 106, and the height 130H of the central area 102 may be equal to, or preferably greater than, the sum of the heights 136H, 138H of the top side area 104 and the bottom side area 106 respectively.

The removable left side area 108 may have a width 132W and the removable right side area 110 may have a width 134W. The width 132W of the removable left side area 108 may or may not be equal to the width 134W of the removable right side area 110, and the width 130W of the central area 102 may preferably be greater than or equal to the sum of the widths 132W, 134W of the removable left (108) and right side (110) areas respectively.

The left portion 126L and the right portion 128R comprising the foldable bottom area 106 may each include a slit or cut 140. Embodiments where only the left portion 126L or the right portion 128R includes the slit 140 are also contemplated.

Figure 2:
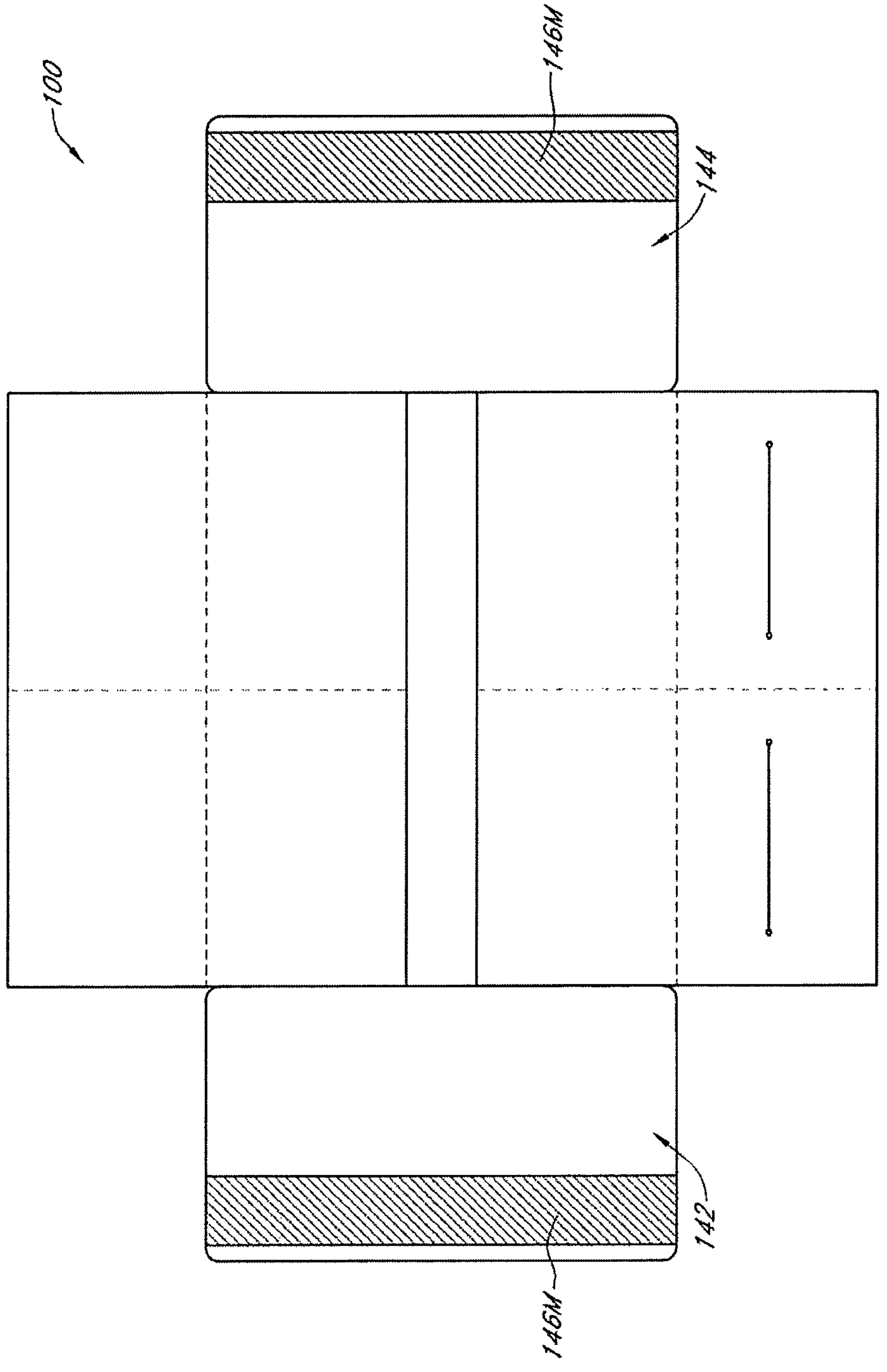
FIG. 2 is a top view of the card carrier of FIG. 1 having cards secured to a left side area and a right side area.

Attention is now directed to FIG. 2. As can be seen, a first card 142 may be adhered to the front face 108F (FIG. 1) of the removable left side area 108, and a second card 144 may be adhered to the front face 110F of the removable right side area 110. The cards 142, 144 may be adhered to the removable left and right side areas 108, 110 by a variety of methods, such as via adhesives or mechanical fasteners, et cetera. The first card 142 and the second card 144 may, but need not be adhered to the removable left side area 108 and the removable right side area 110 respectively in the same manner.

As shown in FIG. 2, the cards 142, 144 may be magnetic cards having a magnetic strip 146M (e.g., magnetic key entry cards for hotels). It will be appreciated, however, that other types of cards may also be used. For example, the cards 142, 144 may be business cards, customer loyalty cards, gift cards, coupons, et cetera.

The cards 142, 144 may, but need not be constructed of the same material(s) as the carrier 100, and the first card 142 may or may not be the same as the second card 144. Suitable materials for constructing the cards 142, 144 may include, for example, paper, plastic, composite, and metal. Where the cards 142, 144 are magnetic, it may be desirable to adhere the cards 142, 144 to the removable left and right side areas 108, 110 such that the magnetic strip 146M face away from the front faces 108F, 110F of the removable left and right side areas 108, 110 respectively.

Figure 3:
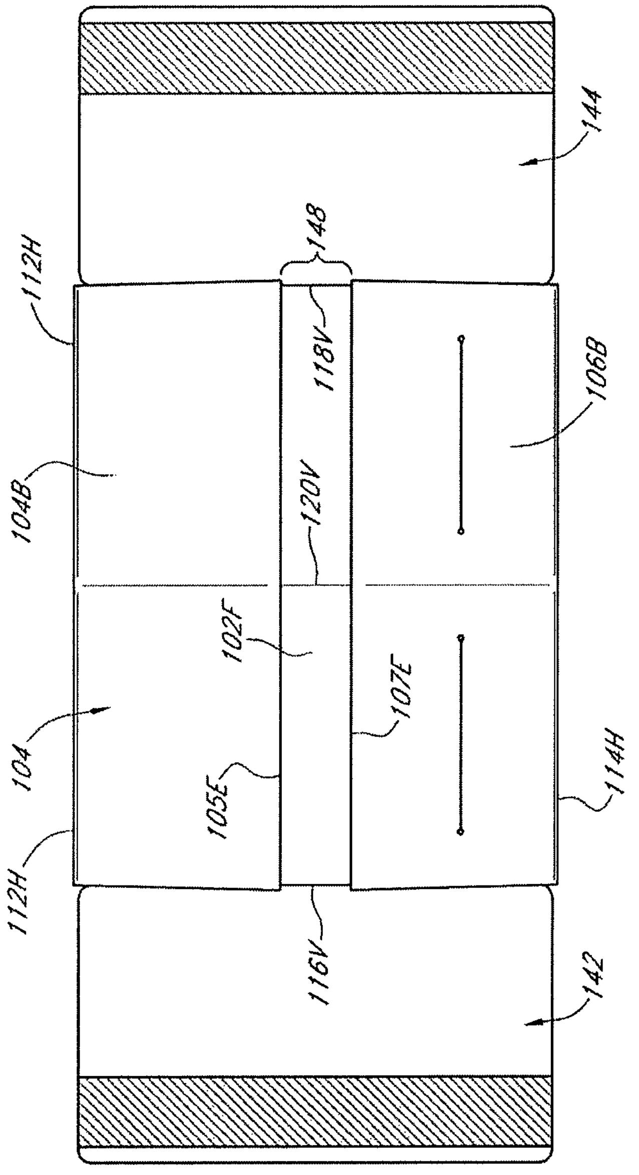
FIG. 3 is a top view of the card carrier of FIG. 1 having a top area and a bottom area folded inward toward a central area.

Attention is now directed to FIG. 3. The foldable top area 104 may be folded along the upper horizontal border 112H such that its front face 104F is adjacent the front face 102F of the central area 102, and the outer edge 105E of the foldable top area 104 faces the foldable bottom portion 106B. The foldable bottom area 106B may similarly be folded along the lower horizontal border 114H such that is front face 104F is adjacent the front face 102F of the central area 102, and the outer edge 107E of the foldable bottom area 106B faces the foldable top portion 104. As can be seen, because the height 130H of the central area 102 exceeds the sum of the heights 13611, 138H of the foldable top side area 104 and the foldable bottom side area 106, that, when so folded, the outer edge 105E of the foldable top side area 104 and the outer edge 107E of the foldable bottom side area 106 are spaced apart by a vertical distance 148. This vertical distance 148 may act as a finger slide, allowing contents in the pocket formed by the central area 102, the top area 104, and the bottom area 106 to be easily removed without unfolding the top area 104 or the bottom area 106.

Figure 4:
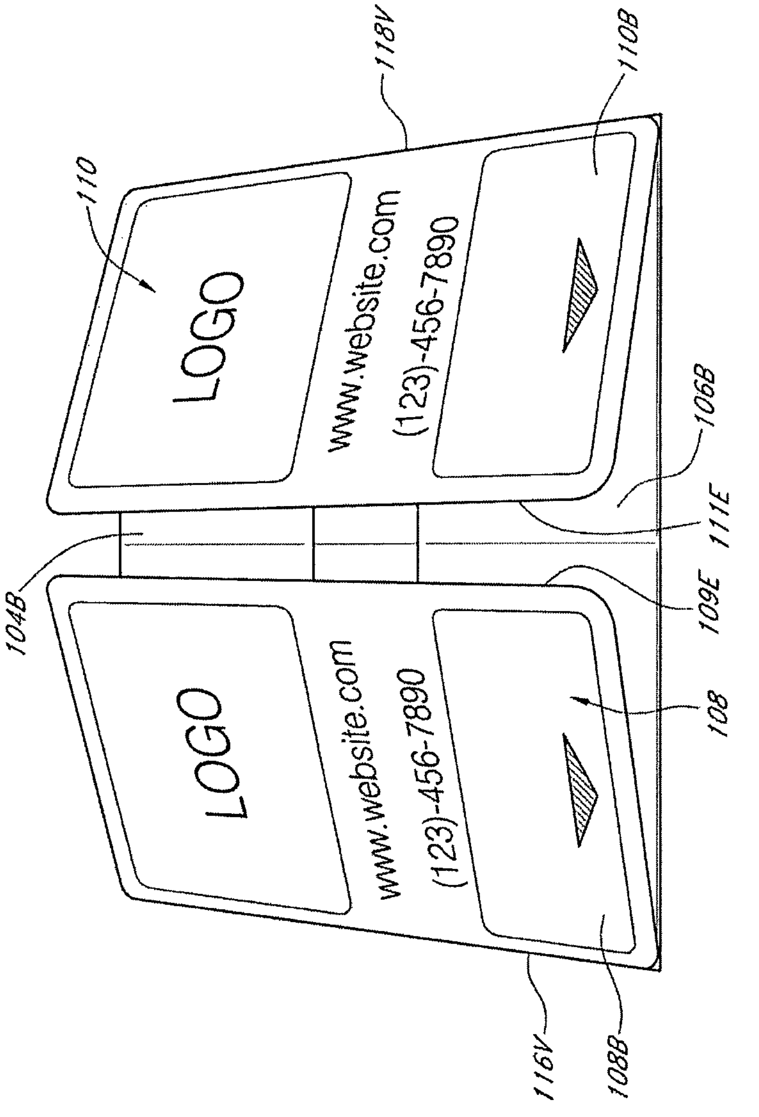
FIG. 4 is a top view of the card carrier of FIG. 1 having the left side area and the right side area folded inward.

As shown in FIG. 4, the left side area 108, to which the card 142 is now adhered, may be folded inward along the left vertical border 116V such that the card 142 is adjacent the folded back faces 104B, 106B of the top and bottom side areas 104, 106 respectively, and the outer edge 109E of the left side area 108 faces the right side area 110. Similarly, the right side area 110, to which the card 144 is secured, may be folded inward along the right vertical border 118V such that the card 144 is adjacent the folded back faces 104B, 106B of the top and bottom side areas 104, 106 respectively, and the outer edge 111E of the right side area 110 faces the outer edge 109E of the left side area 108.

Figure 5:
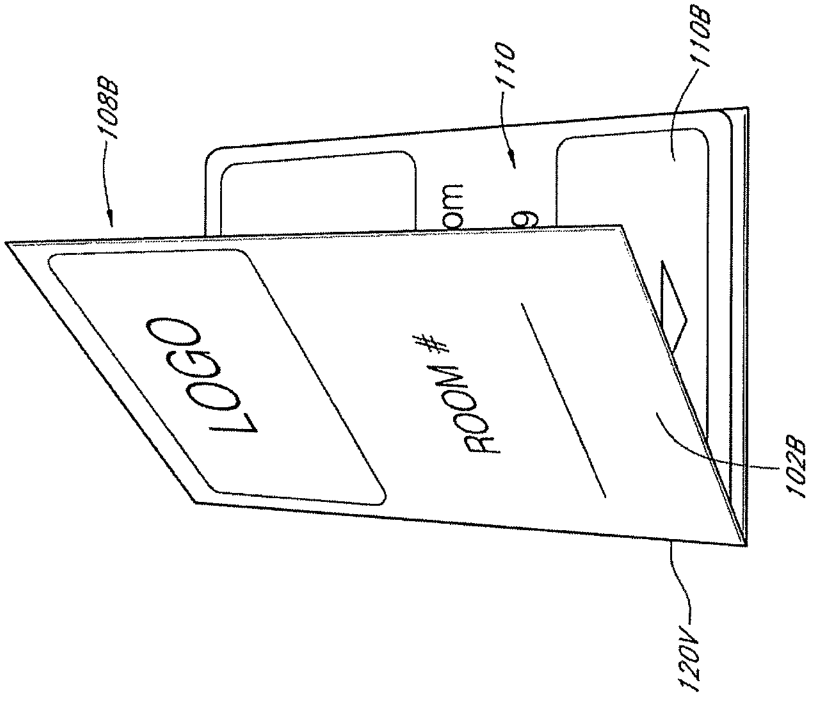
FIG. 5 is a perspective view of the card carrier of FIG. 1 showing a back face of the central area.
Figure 6:
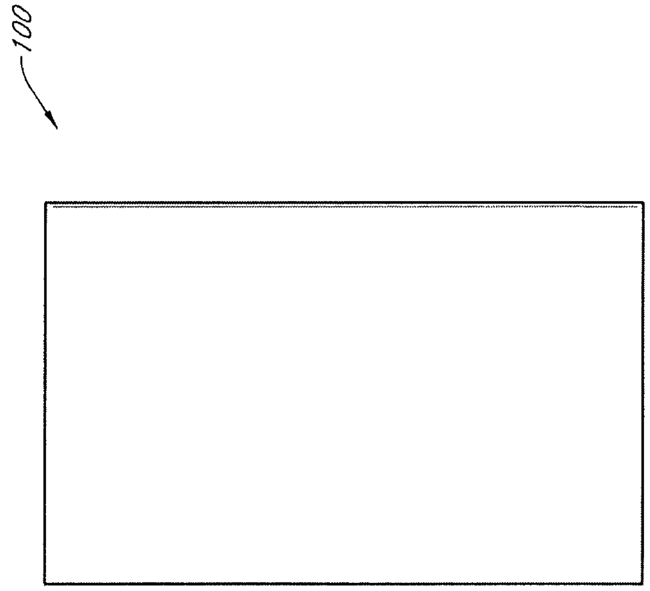
FIG. 6 is a top view of the card carrier of FIG. 1 in a folded position.

The central area 102 (and the top area 104 and the bottom area 106, which are folded inward towards the central area 102) may now be folded along the central vertical border 120V (see FIG. 1). Specifically, as shown in FIG. 5, the central area 102 may be folded along the central vertical border 120V such that the back face 108B of the left side area 108 and the back face 110B of the right side area 110 (see FIG. 4) are adjacent each other. In this way, the all-in-one card carrier 100 may be folded into a compact unit (see FIG. 6). The card carrier 100 may be sold or otherwise provided to a business in this form (i.e., inclusive of cards 142, 144). Or, a business may procure only the carrier 100 and thereafter adhere the cards 142, 144 to the carrier 100. The business, instead of having to provide to its customers separate cards and a card carrier, may now offer its customers the all-in-one carrier 100 that includes the cards 142, 144.

When the customer wishes to use the cards 142, 144 (e.g., to open his hotel room), the customer may first unfold carrier 100 along the central vertical border 120V, as shown in FIG. 4, so that the back face 108B of the left side area 108 is no longer adjacent the back face 110B of the right side area 110. Next, as shown in FIG. 3, the customer may unfold the left side area 108 (to which the card 142 is adhered) along the left vertical border 116V, and the right side area 110 (to which the card 144 is adhered) along the right vertical border 118V, such that the cards 142, 144 are no longer adjacent the folded back faces 104B, 106B of the top and bottom side areas 104, 106 respectively.

The customer may now detach the removable left side area 108 (along with the card 142) from the carrier 100 by tearing or cutting along the left vertical border 116V. The customer may similarly detach the removable right side area 110 (along with the card 144) from the carrier 100 by tearing or cutting along the right vertical border 118V. It will be appreciated that the customer may also detach only the left side area 108 along with the card 142 and leave the right side area 110/card 144 intact, or vice versa. And, in some embodiments, the cards 142, 144 may be separated from the side areas 108, 110 (e.g., by overcoming the adhesive), and the side areas 108, 110 may remain intact with the central area 102.

Figure 7:
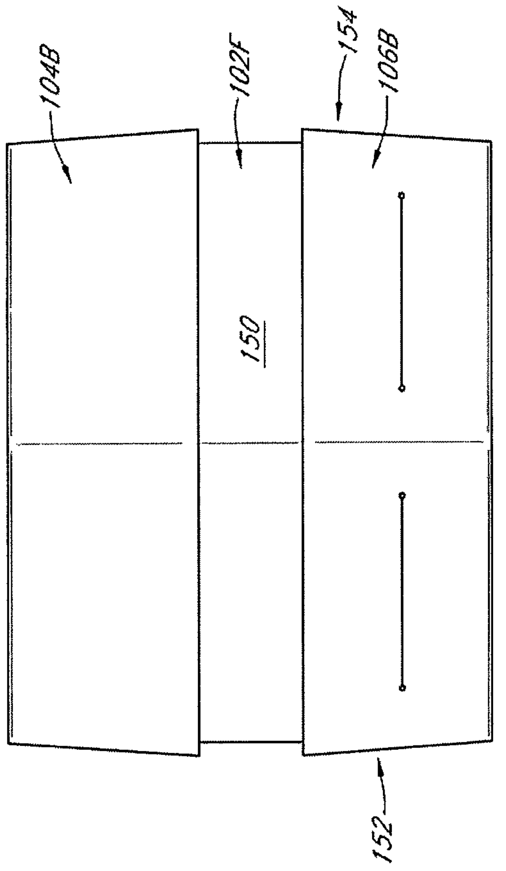
FIG. 7 shows a top view of a pocket in the card carrier of FIG. 1 after the left side area and the right side area have been detached from the central area.
Figure 8:
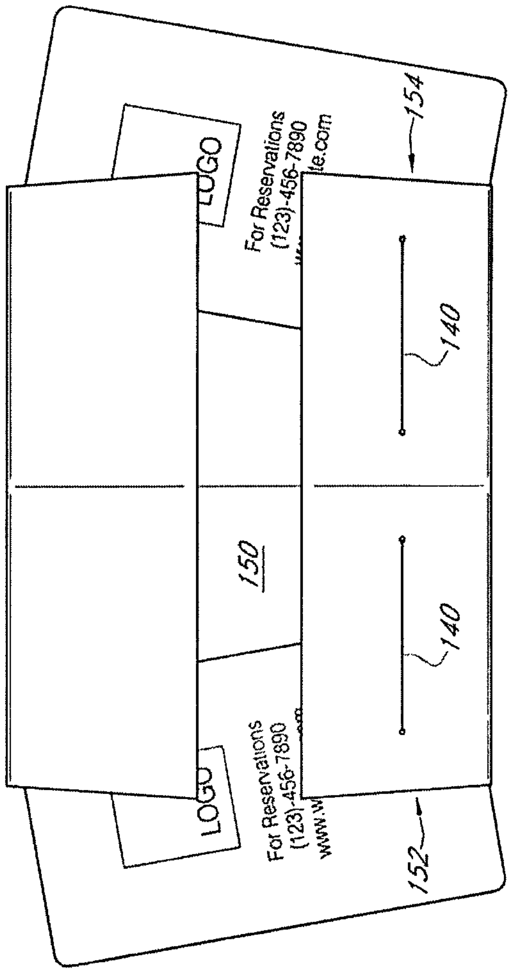
FIG. 8 shows two cards being slid into opposing end openings of the pocket.
Figure 9:
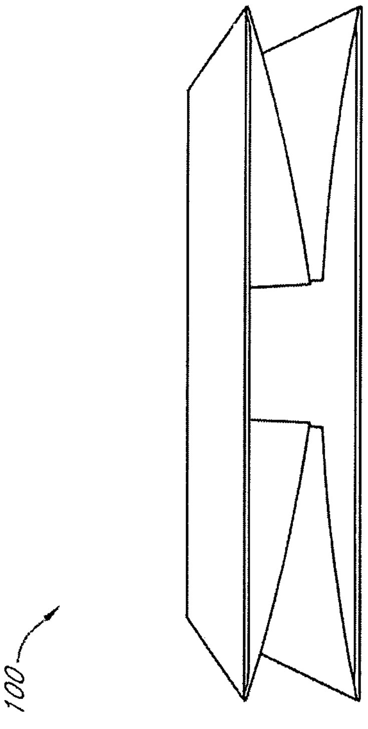
FIG. 9 shows a perspective view of the card carrier of FIG. 1 in a folded position.
Figure 10:
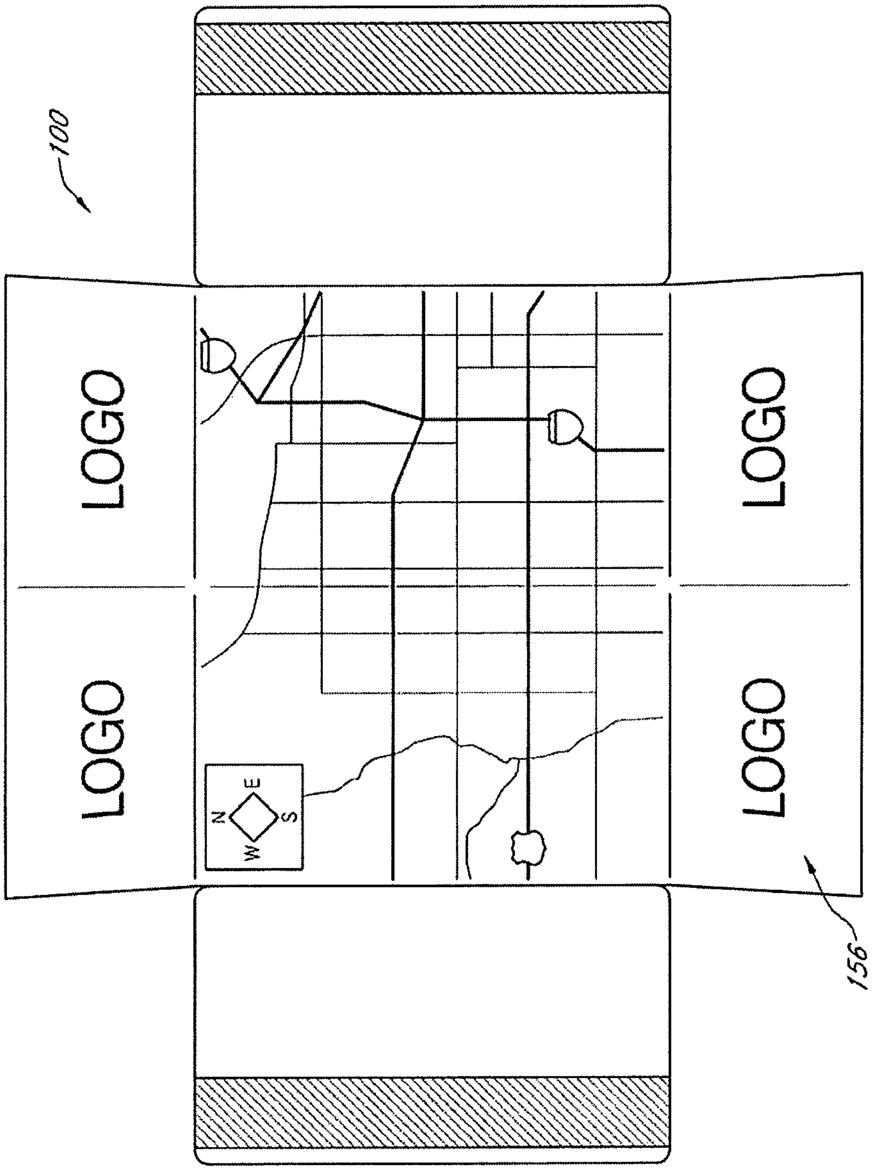
FIG. 10 shows various indicia on the card carrier of FIG. 1.

Once the card 142 and the card 144 have been separated from the carrier 100 (as shown in FIG. 7), the cards 142, 144 may be retained in a receiving area or pocket 150. Specifically, the folded top side area 104, whose front face 104F faces the front face 102F of the central area 102, and the folded bottom side area 106, whose front face 106F faces the front face 102F of the central area 102, in conjunction with the front face 102F of the central area 102, form the pocket 150 for retention of the cards 142, 144. The cards 142, 144 may simply be slid into the pocket 150 via end openings 152, 154 (see FIG. 8), and the central area 102 may then be folded inward along the central vertical border 120V (see FIG. 9) to securely retain the cards 142, 144.

Alternatively, instead of sliding the cards 142, 144 into the pocket 150 via end openings 152, 154 before folding the central area 102 inward along the central vertical border 120V, the cards 142, 144 may be secured within the slits 140 in the left portion 126L and the right portion 128R of the bottom area 106. Retention of the cards 142, 144 in the slits 140 may help prevent the cards 142, 144 from inadvertently slipping out of the carrier 100. In this way, the all-in-one carrier 100 abates the need for businesses to separately store both cards and card carriers.

The all-in-one carrier 100 may also include various indicia 156 (e.g., on the front (102F) and/or back (102B) faces of the central area 102, on the front (104F) and/or back 104B) faces of the top side area 104, on the front (106F) and/or back (106B) faces of the bottom side area, on the back face 108B of the left side area 108, and/or on the back face 110B of the right side area 110). The indicia 156 may be used for targeted advertising. For example, where the all-in-one carrier 100 is being used by a hotel, the carrier 100 may include a map of the hotel's surrounding areas and offers from nearby restaurants and other shops. Or, the indicia 156 may comprise facts, quotes, or puzzles, et cetera. Particularly if the cards 142, 144 are business cards, the indicia 156 may be directed to information about the user's business, background, or associates. The indicia 156 may be added to the carrier 100 before the cards 142, 144 are coupled to the carrier 100, or the indicia 156 may be added at a later time (e.g., by the business using the carrier 100, in line with current promotional offers).

While the disclosure above suggests that the customer detaches the cards 142, 144, it will be appreciated that a business may detach the cards 142, 144, before providing the card carrier 100 to the customer. For example, where the carrier 100 is being used by a hotel to store key cards, the hotel staff may detach the cards 142, 144 to input information necessary to allow a guest to access his room, store the cards 142, 144 in the pocket 150 (or slits 140) as described herein, and then provide the carrier 100/cards 142, 144 to the customer.

As noted above, where the cards 142, 144 are magnetic, it may be desirable to adhere the cards 142, 144 to the removable left and right side areas 108, 110 such that the magnetic strip 146M face away from the front faces 108F, 110F of the removable left and right side areas 108, 110 respectively. Such a configuration may allow businesses (e.g., hotels) to input information on the magnetic strips 146M of the cards 142, 144 without having to first detach the cards 142, 144 from the central area 102.

While the cards 142, 144 are generally described above as being initially separate from the carrier 100, and then being coupled to the carrier 100, in some embodiments, the cards 142, 144 may be initially unitary with the carrier 100. For example, the carrier 100 and the cards 142, 144 may be made of a single piece of appropriate paper (having magnetic strips if desired), and the cards 142, 144 may be distinguished from the central area 102 by perforations. Further, those skilled in the art will appreciate that the cards 142, 144 may be coupled to, or formed by, the top area 104 and/or the bottom area 106 as well as the side areas 108, 110.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A carrier for transporting cards, the carrier comprising:
a first sheet of material having a front side and a back side, wherein:
the front side has:
a central area;
a top area atop the central area, the top area being separated from the central area by a linear upper horizontal border;
a bottom area below the central area, the bottom area being separated from the central area by a lower linear horizontal border; and
a first side area laterally adjacent the central area, the first side area being separated from the central area by a first vertical border, the first vertical border being linear;
the central area, the top area, the bottom area, and the first side area are initially of a unitary construction;
a first card is coupled to or formed by the first side area;
the first card is configured to be detached from the central area;
the top area is configured to be folded inward towards the front side of the central area along the linear upper horizontal border and the bottom area is configured to be folded inward towards the front side of the central area along the linear lower horizontal border to form a pocket;
the pocket is configured to retain the first card with one side of the card touching the front side of the central area and another side of the card touching the front side of the top area; and
the front side of the top area, the bottom area, and the central area have indicia printed thereon for advertising.

2. The carrier of claim 1, further comprising:
a second side area laterally adjacent the central area, the second side area being separated from the central area by a second vertical border, the central area being between the first side area and the second side area; and
wherein a second card is coupled to or formed by the second side area.

3. The carrier of claim 2, wherein:
the second card is configured to be detached from the central area; and
the pocket is configured to retain the second card.

4. The carrier of claim 3 wherein at least one of the first vertical border and the second vertical border comprises perforations.

5. The carrier of claim 4 wherein a height of the central area is not less than the sum of a height of the top area and a height of the bottom area.

6. The carrier of claim 5 wherein the bottom area includes at least one slit, the slit being configured to retain at least one of the first card and the second card.

7. The carrier of claim 4 wherein a width of the central area is not less than the sum of a width of the left side area and a width of the right side area.

8. The carrier of claim 4 wherein the first card is coupled to the first side area by an adhesive.

9. The carrier of claim 4 wherein the first card is formed by the first side area.

10. The carrier of claim 3 wherein the first card includes machine readable indicia.

11. The carrier of claim 1 wherein the first card comprises a magnetic strip on which information may electronically be stored before the first card is detached from the central area.

12. A card with carrier, comprising:
a sheet of material having a front side and a back side, the front side comprising:
a central area;
a bottom area lowerly adjacent and foldable relative to the central area about a first linear fold line, a second linear fold line extending through the central area and the bottom area;
a first side area laterally adjacent and foldable relative to the central area; and
a second side area laterally adjacent and foldable relative to the central area;
a first card coupled to or formed by the first side area, the first card being separable from the central area; and
a top area upwardly adjacent and foldable relative to the central area;
wherein:
the central area, the bottom area, the first side area, and the second side area are initially of a unitary construction;
folding the bottom area inward towards the central area forms a pocket configured to retain the first card;
folding the to area towards the central area further defines the pocket configured to retain the first card; and
when situated in the pocket, one side of the card touches the front side of the central area and another side of the card touches the front side of the bottom area; and
the front side of the top area, the bottom area, and the central area have indicia printed thereon for advertising.

13. The card carrier of claim 12, wherein a second card is formed by the second side area.

14. The card carrier of claim 12, wherein:
the first card is coupled to the another area by an adhesive; and
the first card may be uncoupled from the another area by overcoming the adhesive.

15. The card carrier of claim 14, wherein the bottom area includes at least one slit configured to retain the first card.

16. The card carrier of claim 12, further comprising indicia for advertising printed on the back side of the top area, the bottom area, the central area, the first side area, and the second side area.

17. A carrier for transporting cards, the carrier comprising:
a first sheet of material having a front side and a back side, wherein:
the front side has:
a central area;
a top area atop the central area, the top area being separated from the central area by an upper linear horizontal border;
a bottom area below the central area, the bottom area being separated from the central area by a lower linear horizontal border;
a first side area laterally adjacent the central area, the first side area being separated from the central area by a first vertical border, the first vertical border comprising perforations;
a second side area laterally adjacent the central area, the second side area being separated from the central area by a second vertical border, the second vertical border comprising perforations, the central area being between the first side area and the second side area;

the central area, the top area, the bottom area, the first side area, and the second side area are initially of a unitary construction;

adhesive is used to couple a first card to the first side area and a second card to the second side area;

the first card is configured to be detached from the central area along the first vertical border;

the second card is configured to be detached from the central area along the second vertical border;

the top area is configured to be folded inward towards the front side of the central area along the linear upper horizontal border and the bottom area is configured to be folded inward towards the front side of the central area along the linear lower horizontal border to form a pocket; and the pocket is configured to retain the first card and the second card with one side of the first card or one side of the second card touching the front side of the central area, and another side of the first card or another side of the second card touching the front side of the top area and the front side of the bottom area.

18. The carrier of claim 17, wherein the first card includes a magnetic strip that can be programmed before the first card is detached from the central area.

* * * * *